UNITED STATES PATENT OFFICE.

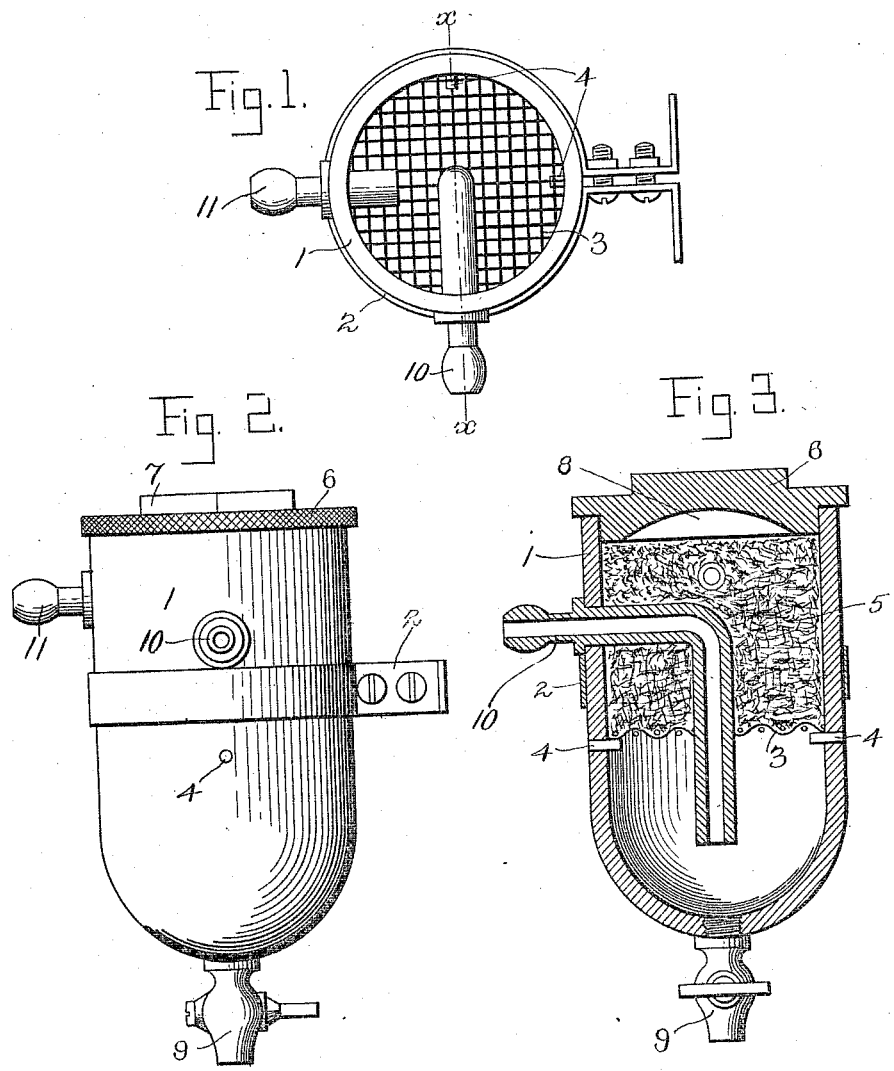

CLARENCE E. SPEER, OF HILLSDALE, MICHIGAN.

GAS-PURIFIER.

995,103.

Specification of Letters Patent. Patented June 13, 1911.

Application filed February 28, 1910. Serial No. 546,367.

*To all whom it may concern:*

Be it known that I, CLARENCE E. SPEER, a citizen of the United States, residing at Hillsdale, in the county of Hillsdale and State of Michigan, have invented certain new and useful Improvements in Gas-Purifiers; and I do hereby declare the following to be a full, clear, and exact description of the invention, such as will enable others skilled in the art to which it appertains to make and use the same.

My invention relates to gas purifiers or filters for purifying acetylene gas.

This device may be used in connection with any generator but is especially suitable to be attached to the generator on an automobile or motor boat.

The object of the invention is to filter and cool gas made in this manner and to catch all the sediment produced by the dissolution of the calcium carbid and water.

Another object is to prevent stoppage in the pipes conducting the gas from the generator to the burners.

Further objects will become apparent from the following description.

The invention consists of a receptacle adapted to be attached to a generator in any suitable manner and provided with inlet and outlet pipes, the former for connection with the generator, and the latter for conducting the purified gas to the burners.

The upper portion of the receptacle or casing into which the outlet pipe enters is filled with a filtering substance or material, preferably mineral wool, cotton or cloth. The inlet pipe passes through said filtering material and terminates below it at about the center of the vacant lower portion or compartment of the receptacle. The reason for having the inlet pipe pass through the filtering material is that the vapor is caused to condense more rapidly when this pipe is kept cool by having said filtering material or absorbent packed around it. The colder said pipe can be kept, the more water will condense and fall to the bottom, thus leaving the gas freer from moisture.

The bottom of the filter casing is curved internally in any vertical section and the inlet pipe terminates above the center thereof. When the gas strikes the bottom, it is, therefore, evenly distributed so that it rises at all sides and strikes the full under surface of the filtering material and the capacity and efficiency of the purifier is thus greatly increased.

The cover of the casing is removable so that the filtering material may be readily renewed. It is also sometimes necessary to take off the cover or cap quickly in order to relieve high pressure. Said cover or cap is made concave on its under face so that the gas will rotate with greater rapidity than if it were flat.

The invention also consists in the features of construction and combinations of parts hereinafter described and specified in the claims.

In the accompanying drawing: Figure 1 is a plan view of a purifier or filter constructed in accordance with my invention, the cover and filtering material being removed. Fig. 2 is an elevation of the purifier complete, and Fig. 3 is a central vertical section on the line $x-x$ of Fig. 1.

Referring more particularly to the drawing, 1 designates the casing of the filter or purifier which may be made of cast, spun or stamped metal and which is generally cylindrical in form except that its lower closed end is rounded or spherical.

In Figs. 1 and 2, I have shown a clamping band 2 by means of which the filter may be connected or attached to a generator or to any suitable support. About midway of the casing, there is placed a screen 3 supported upon pins 4 projecting inwardly from the walls of said casing. The upper compartment formed by said screen is filled with the filtering material 5. The upper end of the casing is closed by the removable cover or cap 6, preferably screw threaded thereon and provided with a wrench-surface 7. The upper concave surface 8 of said cap is shown in Fig. 3. A drain cock 9 is arranged at the bottom of the casing. The inlet pipe 10 enters through the side of the casing near the top thereof and extends horizontally through the filtering material to the center of said casing. At that point, it is bent downwardly and extends vertically to near the middle of the lower vacant compartment of the casing. The outlet or distributing pipe 11 also enters through the side of the casing near the top thereof but terminates within the upper compartment which is filled with the absorbent material. The terminal of said outlet pipe is preferably arranged above the inlet pipe, as illustrated in Fig. 3, and is embedded in or covered by the filtering or absorbent material.

It will be noted that when the cap is removed, the screen 3, as well as the filtering material, may be easily taken out for cleaning or other purposes. This can readily be done, even though the inlet pipe passes through the center of the screen, by tilting said screen until it escapes the pins 4 and then lowering it until it is released from said pipe. It is essential that the screen be removable because its interstices are apt to become crusted and blocked by the solid impurities separated from the gas. The drain cock arranged at the lowest point at the bottom of the casing is of great advantage because it is necessary to draw off the water quickly whenever the casing becomes too full of condensed steam.

I claim:

1. A gas purifier comprising a cylindrical casing entirely open at its upper end and rounded at its bottom, filtering material arranged in the upper portion of said casing, a cover for the open end of the casing, the under surface of said cover being concave for the purpose specified, an outlet pipe terminating in a vertical portion arranged centrally of the casing and adapted to deliver the gas upon the central lowest point on the bottom so that said gas is evenly distributed at all sides and in rising strikes the full under surface of the filtering material, and an outlet pipe for discharging the gas from the casing after it has passed through said filtering material.

2. A gas purifier comprising a cylindrical casing entirely open at its upper end, pins projecting inward about midway of said casing, a screen supported on said pins so that it is capable of being removed through the open upper end of the casing, filtering material arranged above said screen, a removable cover for the open end of said casing, an inlet pipe terminating below the screen, and an outlet pipe for discharging the gas from the casing after it has passed through said filtering material.

3. A gas purifier comprising a cylindrical casing open at its upper end, a removable cover for said open end, an inlet pipe terminating in a vertical portion arranged centrally of the casing and extending down near to the bottom thereof, pins projecting inwardly about midway of said casing, a screen fitted around the vertical portion of said inlet pipe and supported on said pins so that it is capable of being removable through the open end of the casing without removing said pipe, filtering material arranged above said screen, and an outlet pipe for discharging the gas from the casing after it has passed through said filtering material.

In testimony whereof, I affix my signature, in presence of two witnesses.

CLARENCE E. SPEER.

Witnesses:
CLAYTON A. POWELL,
PAUL W. CHASE.